United States Patent
Weston

(10) Patent No.: US 7,264,224 B1
(45) Date of Patent: Sep. 4, 2007

(54) VALVE WITH OFFSET VENTURI

(75) Inventor: Richard R. Weston, Nazareth, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 11/612,537

(22) Filed: Dec. 19, 2006

(51) Int. Cl.
*F16K 1/18* (2006.01)

(52) U.S. Cl. .............. 251/298; 251/305; 261/DIG. 12; 261/DIG. 56

(58) Field of Classification Search ............... 251/124, 251/298, 305–308; 261/DIG. 56, DIG. 12; 137/115.11, 502
See application file for complete search history.

(56) References Cited

U.S. PATENT DOCUMENTS

| | | | | |
|---|---|---|---|---|
| 2,172,935 A | * | 9/1939 | Ewart ........................ 251/118 |
| 2,402,208 A | * | 6/1946 | Read .......................... 251/305 |
| 2,414,751 A | * | 1/1947 | Ludeman .................... 251/124 |
| 2,468,416 A | * | 4/1949 | Stresen-Reuter ..... 261/DIG. 56 |
| 2,737,375 A | * | 3/1956 | Kittler ........................ 261/23.2 |
| 3,141,447 A | * | 7/1964 | Jernigan ...................... 261/144 |
| 3,234,966 A | | 2/1966 | Klose ........................ 137/625.3 |
| 3,724,822 A | | 4/1973 | Nambu et al. ................ 261/43 |
| 4,194,477 A | * | 3/1980 | Sugiyama ............ 261/DIG. 19 |
| 4,254,937 A | | 3/1981 | Hubertson ................... 251/305 |
| 4,284,264 A | | 8/1981 | Hubertson ................... 251/305 |
| 4,298,548 A | | 11/1981 | Pontoppidan .............. 261/34.1 |
| 4,411,233 A | | 10/1983 | Chenet et al. ............... 123/439 |
| 4,420,438 A | | 12/1983 | Goosen ........................ 261/65 |
| 4,474,150 A | | 10/1984 | Foley et al. ................. 123/337 |
| 4,559,185 A | * | 12/1985 | Seto et al. ............ 261/DIG. 56 |
| 4,903,649 A | | 2/1990 | Staerzl ....................... 123/73 A |
| 4,905,647 A | | 3/1990 | Kizer et al. ................. 123/337 |
| 5,194,186 A | | 3/1993 | Edlund ....................... 261/64.4 |
| 5,355,673 A | | 10/1994 | Sterling et al. ............... 60/324 |
| 5,374,031 A | | 12/1994 | Semence et al. ............. 251/305 |
| 5,465,696 A | | 11/1995 | Gmelin ........................ 123/337 |
| 5,827,455 A | | 10/1998 | Nakai ......................... 261/23.2 |
| 5,979,871 A | | 11/1999 | Forbes et al. ............... 251/305 |
| 6,006,722 A | | 12/1999 | Hall ........................... 123/337 |
| 6,109,293 A | * | 8/2000 | Walrath et al. .............. 251/124 |
| 6,283,448 B1 | | 9/2001 | Denton et al. .............. 251/308 |
| 6,554,250 B2 | | 4/2003 | Alves et al. ................. 251/305 |
| 6,679,211 B2 | | 1/2004 | Nickel .................... 123/179.14 |
| 6,824,119 B2 | | 11/2004 | Conley et al. ............... 251/305 |
| 6,871,843 B2 | | 3/2005 | Abei et al. .................. 261/41.5 |
| 6,923,157 B2 | | 8/2005 | Torii et al. .................. 123/337 |
| 6,932,058 B2 | | 8/2005 | Nickel et al. ............... 123/438 |
| 7,011,298 B2 | | 3/2006 | Gerhardy et al. ............. 261/46 |
| 2002/0117646 A1 | | 8/2002 | Jessberger et al. .......... 251/305 |
| 2002/0134339 A1 | | 9/2002 | Nickel .................... 123/179.14 |
| 2003/0122100 A1 | | 7/2003 | Baumann ..................... 251/305 |
| 2003/0209682 A1 | | 11/2003 | Jessberger et al. .......... 251/305 |
| 2004/0012102 A1 | | 1/2004 | Gerhardy ..................... 261/38 |
| 2004/0051186 A1 | | 3/2004 | Gerhardy et al. ............. 261/43 |

(Continued)

*Primary Examiner*—John Bastianelli
(74) *Attorney, Agent, or Firm*—Synnestvedt & Lechner LLP

(57) ABSTRACT

A valve is disclosed having a valve closing member that divides the valve bore into passageways of unequal cross sectional areas when in an open position. A venturi is positioned within the valve bore upstream of the valve closing member. The throat of the venturi may be within one pipe diameter of the valve closing member. The venturi is offset from the bore centerline so as to align with the larger of the two passageways. Turbulence is reduced allowing more accurate pressure measurements to be made within the venturi yielding more accurate determination of volumetric flow rates.

31 Claims, 4 Drawing Sheets

U.S. PATENT DOCUMENTS

| | | |
|---|---|---|
| 2004/0149952 A1 | 8/2004 | DePenning et al. ......... 251/305 |
| 2004/0187844 A1 | 9/2004 | Torii et al. .................. 123/337 |
| 2004/0227261 A1 | 11/2004 | Gangler et al. ............ 261/64.3 |
| 2005/0022790 A1 | 2/2005 | Nickel et al. ................ 123/438 |
| 2005/0082694 A1 | 4/2005 | Grant .......................... 261/63 |
| 2005/0121640 A1 | 6/2005 | Lolli ........................... 251/305 |
| 2005/0224743 A1 | 10/2005 | Boardman et al. .......... 251/308 |
| 2006/0027210 A1 | 2/2006 | Hannewald et al. ........ 123/337 |
| 2006/0038151 A1 | 2/2006 | Nakamura ................... 251/305 |
| 2006/0219194 A1 | 10/2006 | Geyer et al. .............. 123/73 A |

\* cited by examiner

VALVE WITH OFFSET VENTURI

FIELD OF THE INVENTION

This invention relates to valves that incorporate a venturi to permit pressure measurements to be made for ascertaining flow rate therethrough.

BACKGROUND OF THE INVENTION

It is advantageous to combine a fluid flow rate measuring device with a valve. Such a device provides a compact means for precisely controlling the flow of fluid to readily establish a desired volumetric flow rate. One example of such a device is provided by positioning a venturi immediately upstream of a butterfly valve. Immediately upstream in this example means that the venturi is located within one or two pipe diameters of the valve closing member. While this configuration provides a compact design, the closeness of the venturi to the internal valve components does not allow accurate pressure measurements to be made from which the volumetric flow rate may be determined. Turbulence in the flow through the valve caused by the valve closing member (a plate or disk in a butterfly valve) causes the pressure in the venturi to fluctuate randomly, thereby reducing the ability to make accurate pressure measurements, and hence adversely affects the flow rate determination. The position and degree of turbulence is further varied in the venturi as the valve closing member is moved, making it difficult to adjust the position of the valve closing member in response to real time pressure measurements to obtain a desired flow rate.

There is clearly a need for a combination valve and flow rate measurement device which provides a compact design which also provides accurate flow rate measurements in close proximity to the valve.

SUMMARY OF THE INVENTION

The invention concerns a valve for controlling fluid flow. The valve comprises a housing having a bore extending therethrough, a valve seat and a valve closing member mounted within the bore. The closing member is movable between a closed position sealingly engaged with the seat, and an open position wherein the closing member divides the bore into first and second passageways. The first passageway has a larger cross sectional area than the second passageway. A venturi is positioned within the bore upstream of the valve seat. The venturi has a throat offset from the bore centerline so as to align substantially with said first passageway. To effect the offset, the venturi may comprise a pair of asymmetrical surfaces positioned within the bore opposite to one another.

The venturi may also comprise an upstream surface located within the bore and oriented angularly with respect to the bore centerline, and a downstream surface located within the bore and oriented angularly with respect to the bore centerline. The upstream surface converges toward the throat, whereas the downstream surface diverges therefrom. The upstream surface may have a different angular orientation than the downstream surface.

In one embodiment, the valve closing member comprises a plate rotatably mounted within the bore. The plate is offset from its axis of rotation and thereby divides the bore into first and second passageways when the plate is in the open position and oriented substantially parallel to the fluid flow path through the bore.

In another embodiment, the valve comprises a housing having a bore extending therethrough. A throttle plate is mounted within the bore. The throttle plate is rotatable between a first position, wherein the throttle plate is oriented transversely to a fluid flow path through the bore, and a second position, wherein the throttle plate is oriented substantially parallel to the fluid flow path. The throttle plate is offset from the centerline of the bore when in the second position and thereby divides the bore into first and second passageways. The first passageway has a larger cross sectional area than the second passageway. A venturi is positioned within the bore upstream of the throttle plate. The venturi has a throat offset from the bore centerline so as to align substantially with the first passageway. The venturi may have a pressure tap for making pressure measurement for use in determining and setting flow rates through the valve.

BRIEF DESCRIPTION OF THE DRAWINGS

FIG. 1A is an upstream end view of another embodiment of a valve with an offset venturi according to the invention;

DETAILED DESCRIPTION OF THE EMBODIMENTS

Figures 1, 2:
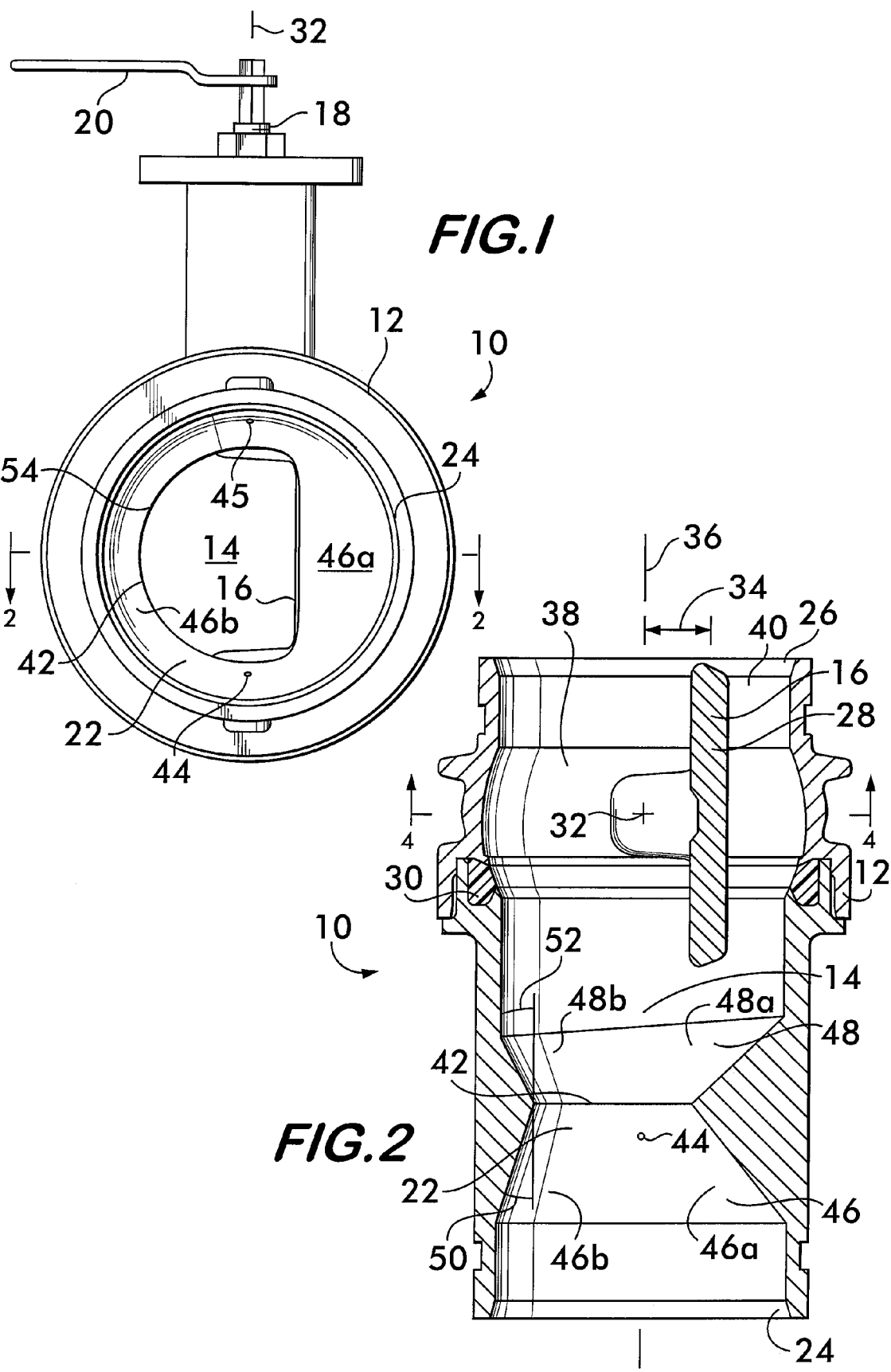
FIG. 1 is an upstream end view of a valve with an offset venturi according to the invention.
FIG. 2 is a longitudinal sectional view taken at line 2-2 of FIG. 1 showing the valve in an open configuration.

FIG. 1 shows a valve 10 according to the invention. Valve 10 comprises a housing 12 having a bore 14 therethrough. A valve closing member 16 (see also FIG. 4) is positioned within the housing. The closing member, described in detail below, is connected to an actuator, for example, valve stem 18 having a handle 20 for manual valve operation. A venturi 22 is positioned within the bore 14 between the valve inlet 24 and the valve closing member 16. An outlet 26, best shown in FIG. 2, is positioned downstream of the valve closing member.

Figure 3:
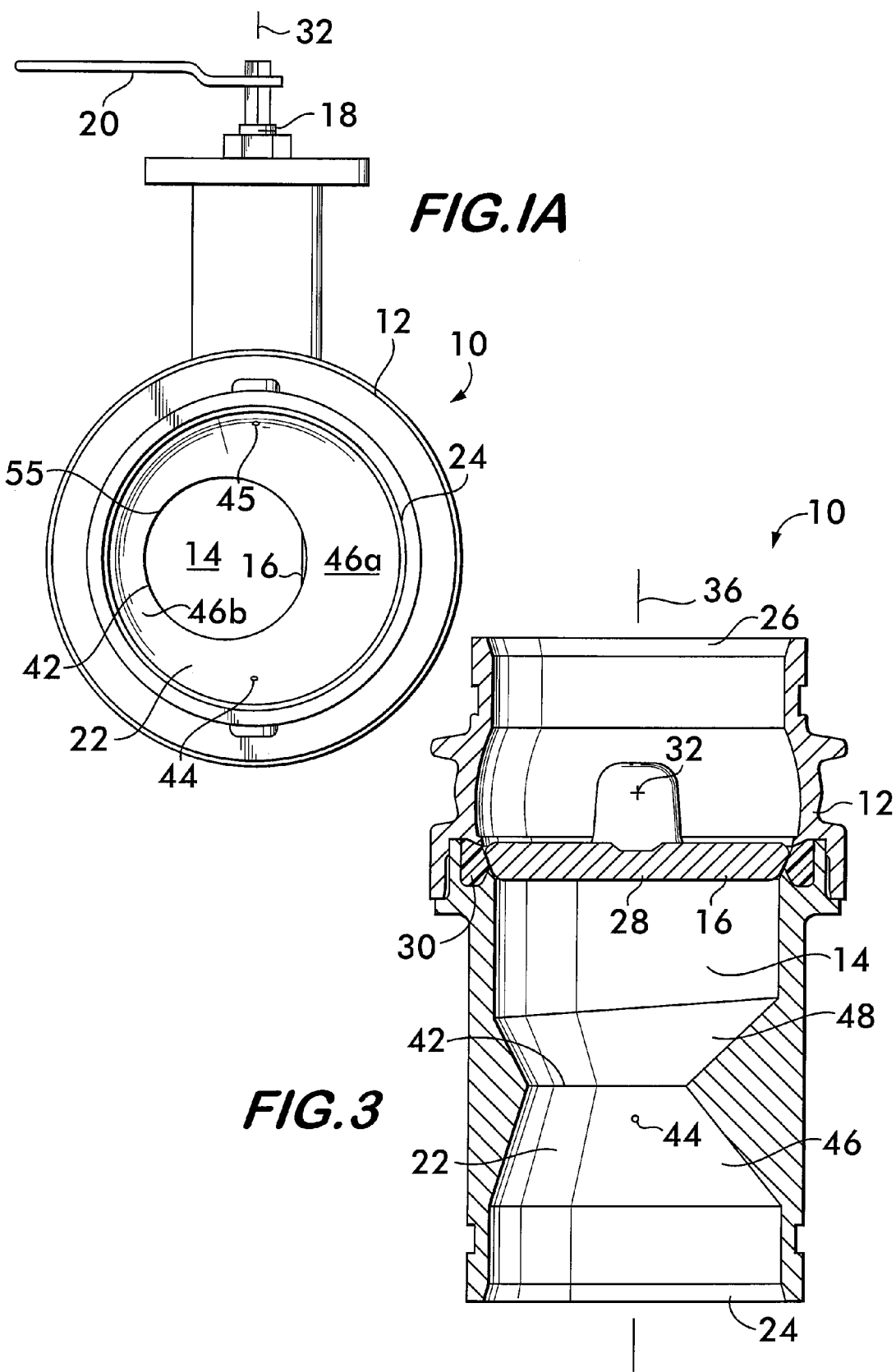
FIG. 3 is a longitudinal sectional view taken at line 2-2 of FIG. 1 showing the valve in a closed configuration.

In this example, the valve 10 is a butterfly valve having a closing member comprising a plate 28 rotatably mounted within the housing 12. As shown in FIGS. 2 and 3, the plate 28 is rotatable between a fully closed position (FIG. 3) wherein the plate sealingly engages a seat 30, and a fully open position (FIG. 2) wherein the plate 28 is oriented substantially parallel to the fluid flow path through the bore 14. Seat 30 may comprise, for example, a flexible ring formed of resilient, compliant materials such as EPDM and nitrile which provides a fluid tight seal when engaged by the plate 28. Other feasible materials include polytetrafluoroethylene.

Figure 4:
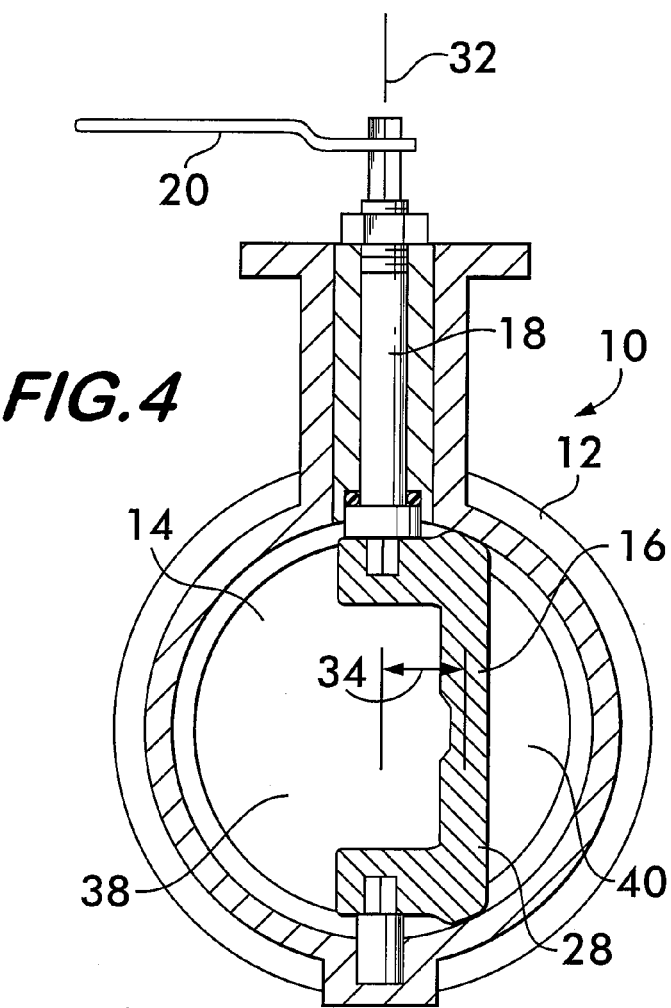
FIG. 4 is a cross-sectional view taken at line 4-4 of FIG. 2.

The plate 28 is offset from its axis of rotation 32 by an offset distance 34. This offset of the plate from its rotation axis also positions the plate offset from the centerline 36 of bore 14 when the valve is in the fully open position as best shown in FIG. 2. As shown in FIG. 4, the offset plate 28 effectively divides the bore 14 into two passageways, 38 and 40, of unequal cross-sectional area, passageway 38 having the larger area in this example.

With reference again to FIG. 2, the venturi 22 has a throat 42 positioned within the bore 14 upstream of the valve seat 30. Throat 42 is also offset from the bore centerline 36 so that it aligns substantially with the larger passageway 38. The offset venturi channels the flow from the inlet 24 through the passageway 38 so that the turbulence normally associated with the flow through the venturi throat and past the plate is reduced significantly. The reduction in turbulence allows for accurate pressure measurements to be made in the vicinity of the venturi throat 42 using pressure taps 44 and 45 (see FIG. 1) despite the fact that the venturi throat is within about one pipe diameter of the plate 28. Pressure measurements are made using two flow areas upstream of the venturi throat, as indicated by the relative positions of taps 44 and 45. Note that the position of tap 44 is downstream from that of tap 45, thereby allowing a differential pressure to be measured along the flow path through the venturi. It is expected that the reduced turbulence of the design will provide enhanced flow stability, allowing accurate pressure measurements to be made, from which accurate flow rate information may be derived.

The offset venturi configuration in combination with the offset valve plate is expected to be particularly effective at reducing pressure fluctuations at the pressure taps due to a change in the position of the valve closing member, in this example, plate 28. This is because flow streamlines are moved further away from the centerline of the valve as the disk closes. The offset of the venturi is designed to accommodate this shift of the flow and reduce turbulence, thereby providing accurate measurements of flow rate at any plate angle and for any valve pressure differential.

The pressure taps are preferably positioned in spaced relation on the upstream surface 46 of the venturi 22. Upstream surface 46 is angularly oriented with respect to the bore centerline 36 and converges toward the throat 42, whereas a downstream surface 48 is also angularly oriented with respect to the centerline 36, but diverges away from the throat. The upstream surface 46 may have a different orientation angle 50 from the orientation angle 52 of the downstream surface 48. Orientation angles of the upstream surface may range between about 0 degrees and about 80 degrees. Orientation angles of the downstream surface may range between about 0 degrees and about 80 degrees as well.

The offset of the venturi throat 42 is effected by forming asymmetrical upstream and downstream surfaces 46a, 48a, 46b, 48b positioned on opposite sides of the venturi. The asymmetry results from the surfaces 46a and 48a extending further radially into the bore 14 than surfaces 46b, 48b positioned opposite them. This may result in a throat having a non-circular cross section 54 (see FIG. 1) as well as a non-constant orientation angle of the surfaces as a function of circumferential position within the bore. The throat may also have a circular cross section 55 as shown in FIG. 1A.

Figure 5:
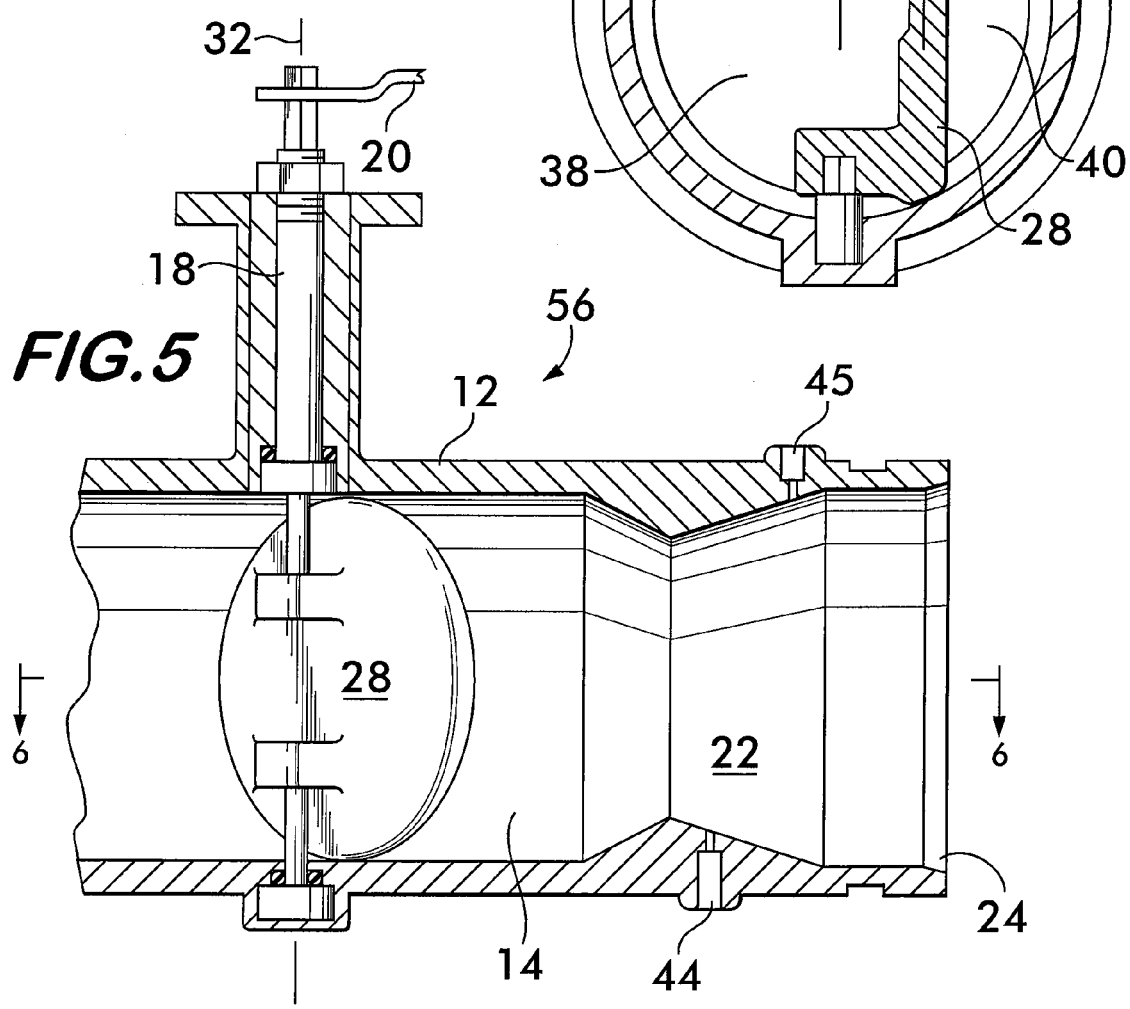
FIG. 5 is a longitudinal sectional view of another embodiment of a valve having an offset venturi according to the invention.
Figure 6:
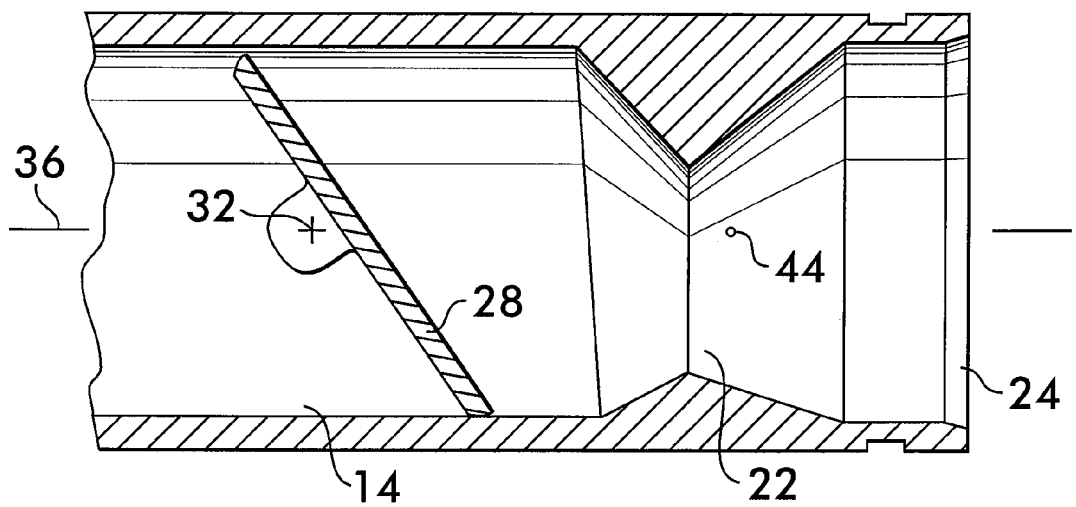
FIG. 6 is a longitudinal sectional view taken at line 6-6 of FIG. 5 showing the valve in a closed configuration.
Figure 7:
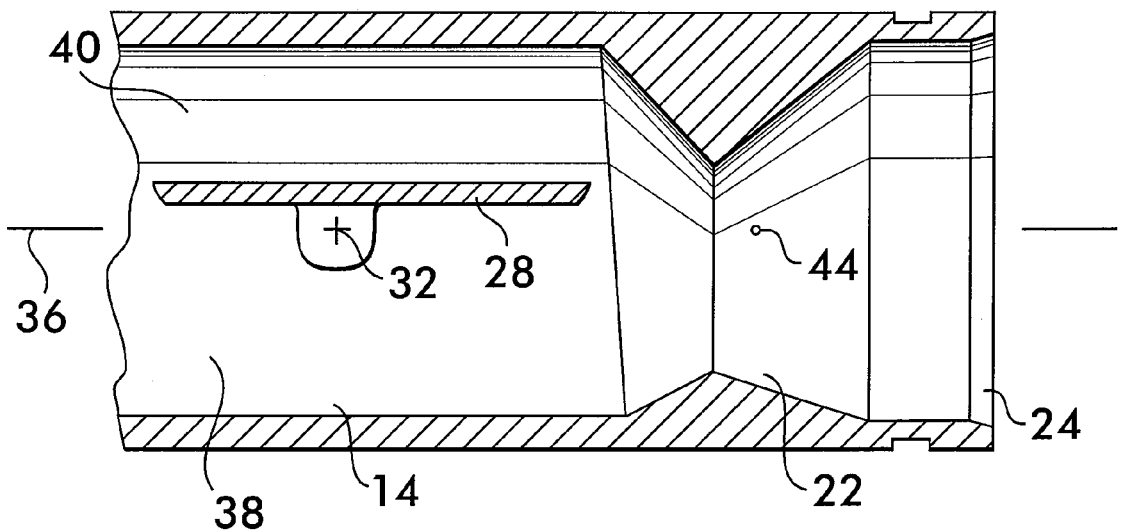
FIG. 7 is a longitudinal sectional view taken at line 6-6 of FIG. 5 showing the valve in an open configuration.

In another valve embodiment 56, shown in FIG. 5, the valve closure member comprises a plate 28 rotatably mounted within housing 12, there being no seat with which the plate engages to fully close the valve. Such a valve may be used to perform a throttling function. As best shown in FIGS. 6 and 7, the plate 28 is movable between a closed and an open position and is offset from the centerline 36 of bore 14. The offset is advantageously accomplished by displacing the plate from its axis of rotation 32. When the plate is substantially parallel to the fluid flow path through the valve as shown in FIG. 7, it divides the bore into passageways 38 and 40 of different cross-sectional areas. The venturi 22, as described above, is positioned between the inlet 24 and the plate 28, the venturi also being offset so as to align substantially with the passageway 38 having the larger cross sectional area. Pressure taps 44 are positioned proximate to the throat 42 allowing pressure measurements for the determination of flow rates through the valve.

Valves according to the invention may be used throughout a wide range of pipe diameters, for example, from about ¼ inch to about 24 inches in diameter. It is, furthermore, convenient to make the housing of separable components permitting disassembly so that the seat may be replaced as necessary. The valve can be adapted to any pipe coupling configuration, a grooved inlet and outlet being shown by way of example, it being understood that flanged ends, plain ends, flared ends or other coupling features are also feasible.

Valves according to the invention are expected to yield a flow having reduced turbulence caused by the valve closing member. The reduction in turbulence, especially during flow transients caused by changes in the valve closing member position, will allow more accurate determination of volumetric flow rates derived from pressure measurements.

What is claimed is:

1. A valve for controlling fluid flow, said valve comprising:
   a housing having a bore extending therethrough;
   a valve seat;
   a valve closing member mounted within said bore, said closing member being movable between a closed position sealingly engaged with said seat, and an open position wherein said closing member divides said bore into first and second passageways, said first passageway having a larger cross sectional area than said second passageway; and
   a venturi positioned within said bore upstream of said valve seat, said venturi having a throat offset from said bore centerline so as to align substantially with said first passageway.

2. A valve according to claim 1, wherein said valve closing member comprises a plate rotatably mounted within said bore, said plate being offset from its axis of rotation and thereby dividing said bore into said first and said second passageways when said plate is in said open position and oriented substantially parallel to a fluid flow path through said bore.

3. A valve according to claim 1, wherein said venturi has a non-circular shape at said throat.

4. A valve according to claim 1, wherein said venturi comprises an upstream surface located within said bore and oriented angularly with respect to said bore centerline, and a downstream surface located within said bore and oriented angularly with respect to said bore centerline, said upstream surface converging toward said throat, said downstream surface diverging therefrom.

5. A valve according to claim 4, further comprising a pair of pressure taps positioned on said upstream surface.

6. A valve according to claim 4, wherein said upstream surface has a different angular orientation from said downstream surface.

7. A valve according to claim 4, wherein said orientation angle of said upstream surface ranges between about 0 degrees and about 80 degrees.

8. A valve according to claim 4, wherein said orientation angle of said downstream surface ranges between about 0 degrees and about 80 degrees.

9. A valve according to claim 1, wherein said venturi throat is positioned within about one pipe diameter of said valve closing member.

10. A valve according to claim 1 wherein said venturi comprises a pair of asymmetrical surfaces positioned within said bore opposite to one another.

11. A butterfly valve for controlling fluid flow, said butterfly valve comprising:
   a housing having a bore extending therethrough;
   a valve seat;
   a valve plate rotatably mounted within said bore, said valve plate being rotatable between a closed position sealingly engaged with said seat, and an open position wherein said valve plate is substantially parallel to a fluid flow path through said bore, said valve plate being offset from a centerline of said bore when in said open position and thereby dividing said bore into first and second passageways, said first passageway having a larger cross sectional area than said second passageway; and
   a venturi positioned within said bore upstream of said valve seat, said venturi having a throat offset from said bore centerline so as to align substantially with said first passageway.

12. A valve according to claim 11, wherein said venturi has a circular shape at said throat.

13. A valve according to claim 11, wherein said venturi has a non-circular shape at said throat.

14. A valve according to claim 11, wherein said venturi comprises an upstream surface located within said bore and oriented angularly with respect to said bore centerline, and a downstream surface located within said bore and oriented angularly with respect to said bore centerline, said upstream surface converging toward said throat, said downstream surface diverging therefrom.

15. A valve according to claim 14, further comprising a pair of pressure taps positioned on said upstream surface.

16. A valve according to claim 14, wherein said upstream surface has a different angular orientation from said downstream surface.

17. A valve according to claim 14, wherein said upstream surface has substantially the same angular orientation as said downstream surface.

18. A valve according to claim 14, wherein said orientation angle of said upstream surface ranges between about 0 degrees and about 80 degrees.

19. A valve according to claim 14, wherein said orientation angle of said downstream surface ranges between about 0 degrees and about 80 degrees.

20. A valve according to claim 11, wherein said venturi throat is positioned within about one pipe diameter of said valve plate.

21. A valve according to claim 11 wherein said venturi comprises a pair of asymmetrical surfaces positioned within said bore opposite to one another.

22. A valve for controlling fluid flow, said valve comprising:
   a housing having a bore extending therethrough;
   a plate mounted within said bore, said plate being rotatable between a first position wherein said plate is oriented transversely to a fluid flow path through said bore, and a second position wherein said plate is oriented substantially parallel to said fluid flow path, said plate being offset from a centerline of said bore when in said second position and thereby dividing said bore into first and second passageways, said first passageway having a larger cross sectional area than said second passageway; and
   a venturi positioned within said bore upstream of said plate, said venturi having a throat offset from said bore centerline so as to align substantially with said first passageway.

23. A valve according to claim 22, wherein said venturi has a non-circular shape at said throat.

24. A valve according to claim 22, wherein said venturi throat is within one pipe diameter of said plate.

25. A valve according to claim 22, wherein said venturi comprises an upstream surface located within said bore and oriented angularly with respect to said bore centerline, and a downstream surface located within said bore and oriented angularly with respect to said bore centerline, said upstream surface converging toward said throat, said downstream surface diverging therefrom.

26. A valve according to claim 25, further comprising a pair of pressure taps positioned on said upstream surface.

27. A valve according to claim 25, wherein said upstream surface has a different angular orientation than said downstream surface.

28. A valve according to claim 25, wherein said orientation angle of said upstream surface ranges between about 0 degrees and about 80 degrees.

29. A valve according to claim 25, wherein said orientation angle of said downstream surface ranges between about 0 degrees and about 80 degrees.

30. A valve according to claim 22, wherein said venturi throat is positioned within about one pipe diameter of said plate.

31. A valve according to claim 22 wherein said venturi comprises a pair of asymmetrical surfaces positioned within said bore opposite to one another.

* * * * *